United States Patent
Becker et al.

(10) Patent No.: US 6,814,825 B2
(45) Date of Patent: Nov. 9, 2004

(54) METHOD AND DEVICE FOR CONTROLLING THICKNESS DURING SPIN COATING

(75) Inventors: Wolfgang Becker, Schaafheim (DE); Edgar Rueth, Kaul am Main (DE); Reinhard Gerigk, Gelnhausen (DE); Eggo Sichmann, Gelnhausen (DE)

(73) Assignee: Singulus Technologies AG, Alzenau (DE)

( * ) Notice: Subject to any disclaimer, the term of this patent is extended or adjusted under 35 U.S.C. 154(b) by 0 days.

(21) Appl. No.: 09/424,660
(22) PCT Filed: May 26, 1998
(86) PCT No.: PCT/EP98/03095
§ 371 (c)(1), (2), (4) Date: Jan. 27, 2000
(87) PCT Pub. No.: WO98/53919
PCT Pub. Date: Dec. 3, 1998

(65) Prior Publication Data
US 2001/0053407 A1 Dec. 20, 2001

(30) Foreign Application Priority Data
May 28, 1997 (DE) .......................................... 197 22 407

(51) Int. Cl.⁷ .............................................. B32B 3/16
(52) U.S. Cl. ............................. 156/74; 156/64; 156/378
(58) Field of Search ........................ 427/8, 9, 10, 240; 118/712, 52; 156/74, 64, 378

(56) References Cited

U.S. PATENT DOCUMENTS

| | | | | |
|---|---|---|---|---|
| 5,127,362 A | * | 7/1992 | Iwatsu et al. | 118/667 |
| 5,658,615 A | * | 8/1997 | Hasebe et al. | 427/240 |
| 5,863,328 A |   | 1/1999 | Sichmann et al. | 118/52 |
| 5,938,891 A | * | 8/1999 | Kashiwagi et al. | 156/578 |
| 5,939,130 A | * | 8/1999 | Shiraishi et al. | 427/9 |

FOREIGN PATENT DOCUMENTS

| | | |
|---|---|---|
| DE | 3822835 | 3/1990 |
| DE | 196 05 601 | 11/1997 |
| EP | 595 749 | 5/1994 |
| EP | 706 178 A2 * | 4/1996 |
| JP | 3-178123 * | 8/1991 |
| JP | 05-002777 * | 1/1993 |
| JP | 7-29809 * | 1/1995 |

OTHER PUBLICATIONS

Patent Absts. of Japan, 622 3418, Aug. 12, 1994, Toshiki; "Spin Coating Method and Device".
Patent Absts. of Japan, 409 4525, Mar. 26, 1992, Harou, "Resist Processing Device".
Patent Absts. of Japan, 317 8123, Aug. 2, 1991, Makoto, "Coating Film Thickness Stabilizing System for Spin Coater".
Patent Absts. of Japan, 59 12 1424, Aug. 29, 1984, Harou, "Coating Device".
Patent Absts. of Japan, 829 3457, Nov. 5, 1996, Hiroshi, "Rotary Coater for Substrate".

* cited by examiner

Primary Examiner—Katherine A. Bareford
(74) Attorney, Agent, or Firm—Pillsbury Winthrop LLP

(57) ABSTRACT

The invention relates to a method and a device for regulating the thickness of coatings or layers, in particular of bond coatings, wherein bonding is controlled in a programmed manner thereby taking into account the influence of disturbance variables. The invention can be used especially in the production of DVDs. The advantages of the present invention are reproducible accuracy in adjusting the thickness of the coating/bond coating and thus an increased production output.

9 Claims, 3 Drawing Sheets

METHOD AND DEVICE FOR CONTROLLING THICKNESS DURING SPIN COATING

BACKGROUND OF THE INVENTION

1. Field of the Invention

The invention relates to a method and a device for regulating or controlling the coating or layer thickness, especially the bond coating thickness and can be used in particular in the production of DVDs (digital versatile disks, i.e. versatile writable and readable storage disks).

2. Description of the Related Art

DE-C1-196 05 601 already describes a device for a controlled surface coating. By means of a nozzle which can be moved parallel to a substrate surface, a lacquer or varnish is applied uniformly, and by a digitally controllable step motor, the nozzle can be moved to any desired location during operation, and thus the surface to be coated can be determined. The influence of the temperature of the substrate to be coated, the temperature of the coating material and its viscosity are not taken into account during coating.

DE-A1-38 22 835 discloses a method and a device for lacquering or varnishing workpiece surfaces. During the operating cycle of a robot, a spraying gun obtains from the robot's control unit a continuously or gradually varying desired value for the lacquer flow. Moreover, the lacquer flow to the spraying gun is measured and readjusted by adjusting the flow resistance on the flow path between lacquer distributor and spraying gun in accordance with its deviation from the present desired value. Moreover, during one operating circle of the robot, the robot's control unit adjusts continuously or gradually varying values for the sprayer and/or horn air flow of the spraying gun. The method relates to the application of lacquer by means of a spraying gun and thus differs basically from the coating method of the present invention in which the coating material is applied by a dosing pump, a dosing arm being movable over the substrate and a rotary drive for rotating the substrate. In this method, especially the quality of the coating of lacquer is important. In particular, it is intended to avoid the occurrence of drops or blots during the application of lacquer. Therefore, the lacquer flow is adapted to the sprayer air. The problem of regulating the thickness of the coating material is not mentioned in the cited reference.

SUMMARY OF THE INVENTION

It was found that there is a reproducible relation between the temperature of the substrates to be coated, the temperature of the coating material and the viscosity of the coating material, on the one hand, and the expected coating thickness during bonding of substrates, on the other hand. FIG. 3 shows, for example, the dependency of the viscosity of the bonding material on the temperature. It was found that if the substrate temperature changes from 40° to 45° C., the bond coating thickness changes from 40 to 35 $\mu$m. For many fields of application, in particular in the case of DVDs, it is of great importance that the bond coating thickness meets narrow tolerances.

Therefore, it is an object of the present invention to provide a method and a device for regulating the coating thickness, wherein a reproducible high accuracy of the coating thickness is achieved.

In achieving the object, the invention starts out from the basic idea of taking into account varying variables (disturbance variables) which influence the coating thickness or bond coating thickness during coating, in particular during bonding, and of controlling bonding in accordance with their influence. During coating/bonding the coating thickness is measured and deviations from a desired value are readjusted. The temperature of the substrate(s) and the temperature of the bonding material, which influence the viscosity of the bonding material, are taken into account as varying variables. The influences of the disturbance variables on the coating thickness and bond coating thickness are determined empirically, and the aggregates involved in the coating and bonding process, such as a dosing pump, a dosing arm, a rotary drive for the coating material application and bonding material application as well as a connecting means for connecting the substrates and a rotary centrifugal drive are controlled in accordance with an algorithm which takes into account the influences of the disturbance variables, in order to achieve a coating thickness which meets a given desired value.

It is an advantage of the present invention that the coating thickness can be adjusted very accurately and that there is a very low reject rate, e.g. in connection with DVDs produced in accordance with the present invention, so that the production process leads to an increased yield.

BRIEF DESCRIPTION OF THE DRAWINGS

In the following, the invention is explained in more detail in connection with the drawings in which.

DESCRIPTION OF THE PREFERRED EMBODIMENTS

Figure 1C:
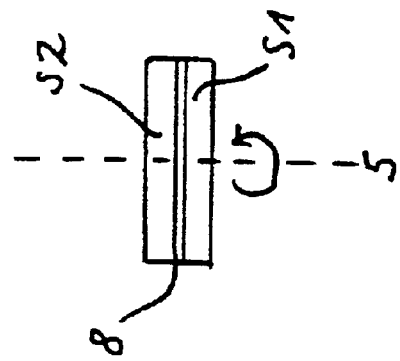
FIGS. 1a to 1c are schematic representations of the bonding process in which the present invention can be applied.
Figure 1B:
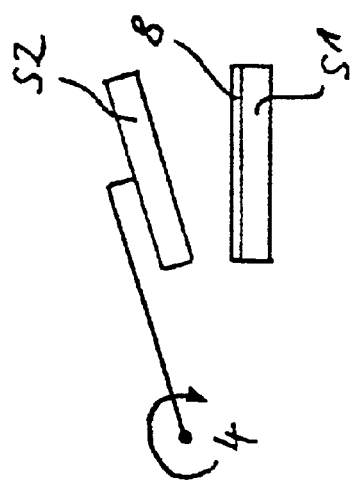
Figure 1A:
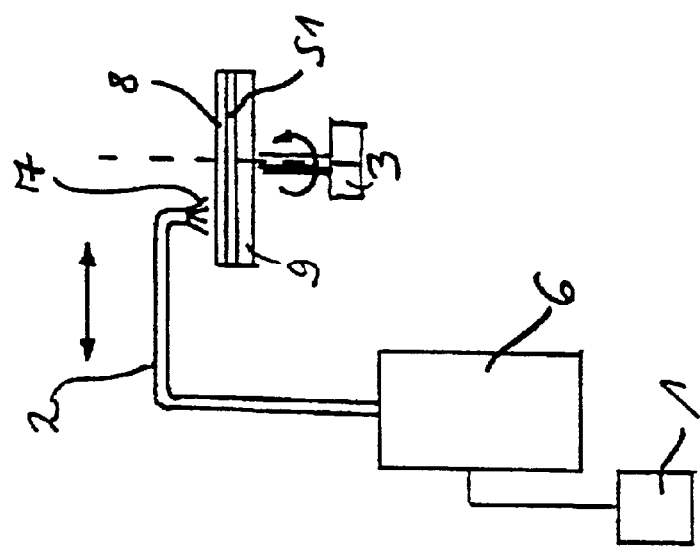

FIG. 1a alone can be regarded as a representation of the bonding process in general. In this process, a coating/bonding material 7 is pumped by a dosing pump 1 out of a reservoir 6 and sprayed onto a substrate S1 via a dosing arm 2. The height of the dosing arm 2 can be adjusted with respect to the substrate 1, and said dosing arm can be moved radially over the substrate. The substrate S1 is located on a plate 9 with is kept in a motion of rotation by a rotary drive 3. The layer or coating 8 is thus formed on the substrate S1. Since the temperature during the coating process and the temperature of the material or substrate used during this process are in general not constant, the coating/bonding material and the substrate(s) have variable temperatures.

During bonding of two substrates, a connecting means 4 places the second substrate S2 onto the coated substrate S1 (FIG. 1b).

Moreover, during bonding, excess bonding material of the coating 8 between the substrates S1 and S2 is spun off by a rotary centrifugal drive 5 (FIG. 1c).

During bonding, the processes according to FIGS. 1b and 1c also influence the expected bond coating thickness, e.g. by the connecting pressure and the speed of the rotary centrifugal drive 5.

It was found that the bonding process as shown e.g. in FIGS. 1a to 1c is influenced by disturbance variables such as the temperatures T1 and T2 of the respective partial substrates S1 and S2, the temperature T3 of the bonding material and the viscosity of the bonding material, so that the bond coating thickness deviates from a given desired value, which only depends on the bond material flow, its distribution on a substrate and the rotational speed of the substrate.

Figure 3:
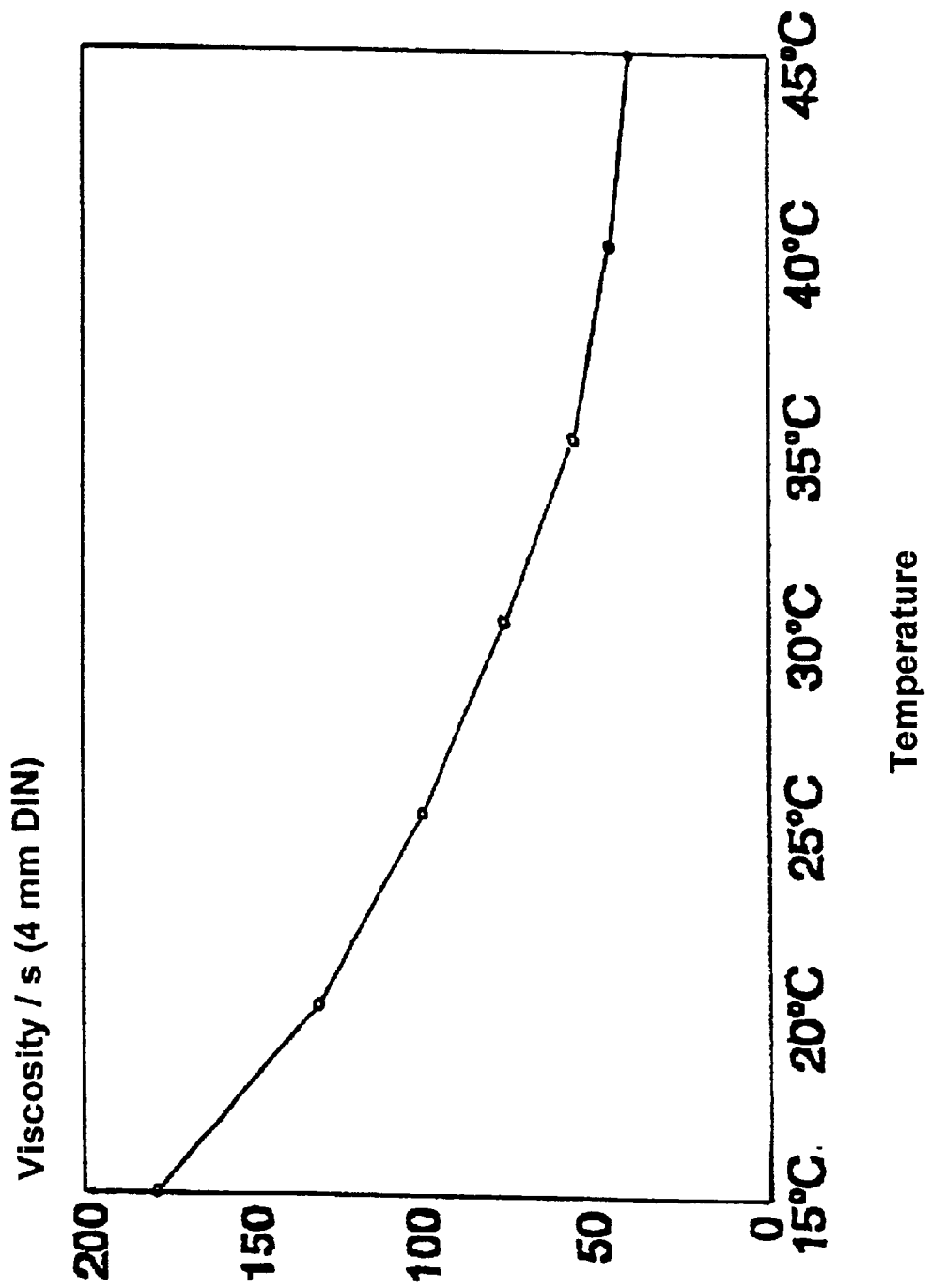
FIG. 3 is a diagram representing the dependency of the viscosity of the bonding material on the temperature.

In accordance with the present invention, reproducible relations between the temperature, the viscosity of the coating material and the bond coating thickness are determined empirically and represented in the form of value tables and curve functions (cf. FIG. 3). The determined functional relations are made the basis of a control program for the aggregates of the coating process.

Figure 2:
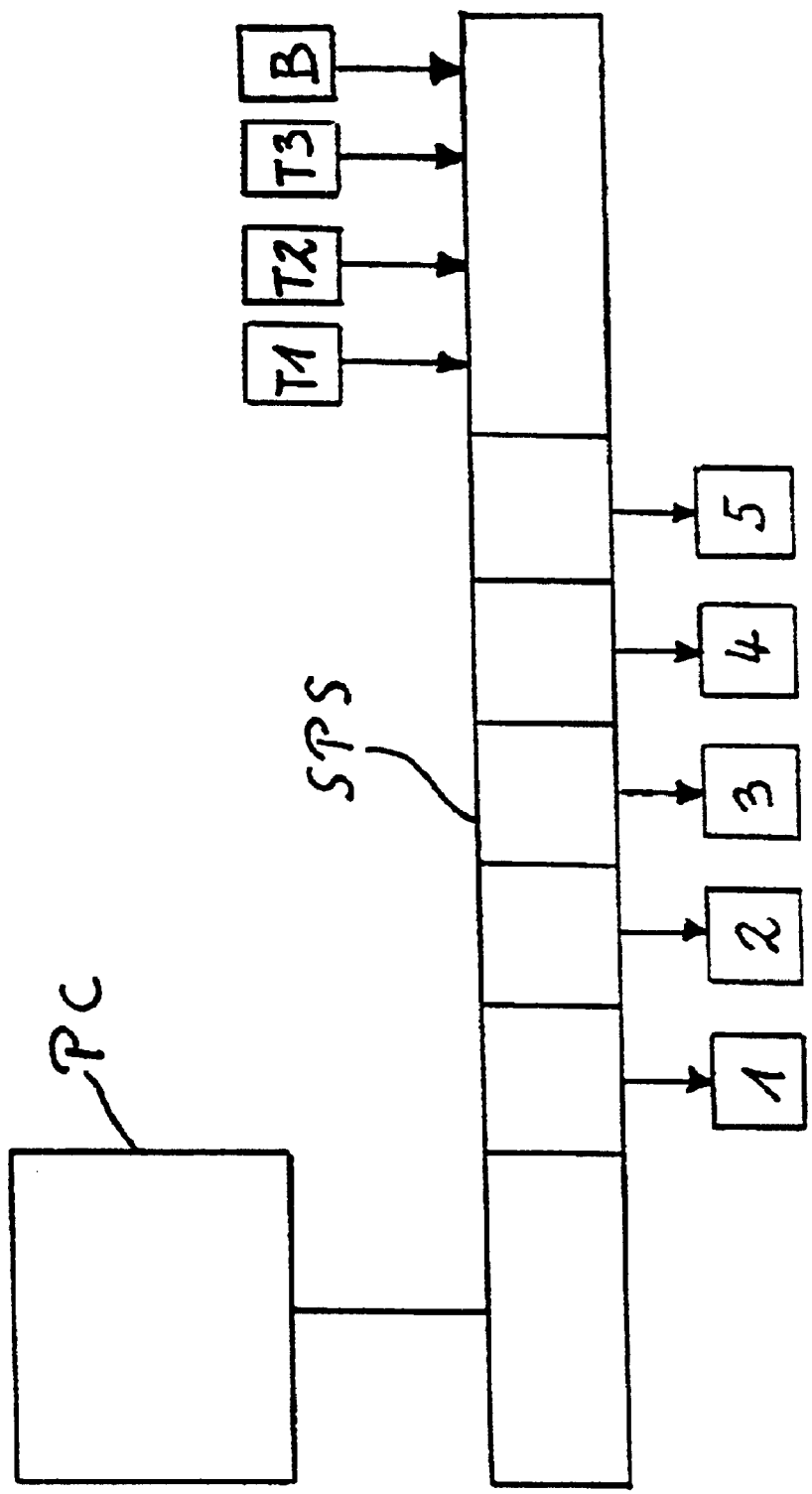
FIG. 2 is a block diagram of the program control of the present invention.

FIG. 2 shows a block diagram for controlling the bonding aggregates.

A computer PC having a memory-programmable controller (SPS) is provided. The disturbance variables such as temperatures T1 and T2 of the respective partial substrates S1 and S2 and the temperature T3 of the bonding material 7 and the kind or type B of the bonding material are inputted into said programmable controller. The PC presets the desired value. Depending on an adapted software, the outputs 1, 2, 3, 4, and 5 of the programmable controller trigger the corresponding bonding aggregates: dosing pump 1, dosing arm 2, rotary drive 3 for the bonding material coating, connecting means 4 and rotary centrifugal drive 5. For example by increasing or decreasing the bond material input, the rotational speeds and/or the rotational time and the connecting pressure, the corresponding bonding aggregates then react against or compensate a deviation of the bond coating thickness from the desired value caused by the temperature change.

A device according to the present invention for performing a method for regulating the bond coating thickness comprises preferably sensors for measuring the disturbance variables, a means for controlling the bond coating thickness during the process and a processor comprising a PC and a programmable controller for controlling bonding in accordance with the disturbance variables and the measured bond coating thicknesses. The sensor for measuring the bond coating thickness is preferably an optical sensor.

Preferably, a plurality of sensors for measuring the coating thickness are provided at different radial distances from the rotational axis of the rotary drive 3, so that the coating thickness can be measured at different points and can be supplied to the controller PC/SPS.

When the method and the device according to the present invention are used in the production of optical storage disks (DVDs), a desired value for the bond coating thickness of e.g. 55 $\mu$m is adjusted, which has a tolerance of ±10 $\mu$m in the radial direction and a tolerance of ±4 $\mu$m in the tangential direction.

In addition to regulating the bond coating thickness, the method and device according to the present invention can also be used for precisely regulating the thickness of other viscous coatings on surfaces, e.g. coatings of lacquer.

What is claimed is:

1. A method of bonding a first planar substrate to a second planar substrate by a bonding material in the form of a viscous fluid, comprising:

pumping the viscous fluid with a dosing pump to a dosing arm connected to the dosing pump and positioned over the first substrate;

forming a layer of viscous fluid on the first substrate by dosing the first substrate with viscous fluid from the dosing arm;

rotating the first substrate with a rotary drive;

positioning the second substrate onto the layer of viscous fluid formed on the first substrate with a connecting means;

spinning off excess viscous fluid of the layer between the first substrate and the second substrate with a rotary centrifugal drive; and controlling a thickness of the layer formed on the first substrate to a predetermined thickness by controlling at least one of the dosing pump, a position of the dosing arm with respect to the first substrate, a rotary speed of the rotary drive, and a rotary speed of the rotary centrifugal drive in response to: (a) a temperature of the first substrate; (b) a temperature of the second substrate; and (c) at least one of a temperature of the viscous fluid and a viscosity of the viscous fluid.

2. The method according to claim 1, further comprising:

measuring the thickness of the layer; and automatically adjusting deviations between the measured thickness of the layer and the predetermined thickness to within at least one tolerance.

3. The method according to claim 2, wherein the at least one tolerance includes a range in at least one of a radial direction of the first substrate and a tangential direction of the first substrate.

4. The method according to claim 1, further comprising:

controlling the thickness of the layer of viscous fluid by controlling at least one of a connecting pressure of the connecting means and a rotary speed of the rotary centrifugal drive.

5. A method of producing optical storage disks, comprising:

utilizing the method of claim 1.

6. an apparatus for bonding a first planar substrate to a second planar substrate by a bonding material in the form of a viscous fluid, comprising:

a pump that pumps the viscous fluid;

a dosing arm, connected to the pump and positioned over the first substrate, that doses the first substrate with the viscous fluid and forms a layer of the viscous fluid on the first substrate;

a plate that supports the first substrate;

a rotary drive that rotates the plate;

a connecting means that positions the second substrate onto the layer of viscous fluid formed on the first substrate;

a rotary centrifugal drive that spins off excess viscous fluid of the layer between the first substrate and the second substrate; and a controller that controls a thickness of the layer to a predetermined thickness by controlling at least one of the dosing pump, a position of the dosing arm, a rotary speed of the rotary drive, and a rotary speed of the rotary centrifugal drive in response to: (a) a temperature of the first substrate; (b) a temperature of the second substrate; and (c) at least one of a temperature of the viscous fluid and a viscosity of the viscous fluid.

7. The apparatus according to claim 6, further comprising:

at least one sensor that measures the thickness of the layer; wherein the controller controls at least one of the dosing pump, the position of the dosing arm, the rotary speed of the rotary drive, and the rotary speed of the rotary centrifugal drive to automatically adjust deviations between the measured thickness of the layer and the predetermined thickness to within at least one tolerance.

8. The apparatus according to claim 7, wherein the at least one tolerance includes a range in at least one of a radial direction of the first substrate and a tangential direction of the first substrate.

9. The apparatus according to claim 6, wherein the controller controls the thickness of the layer of viscous fluid by controlling at least one of a connecting pressure of the connecting means and a rotary speed of the rotary centrifugal drive.

* * * * *